(12) United States Patent
Luethy et al.

(10) Patent No.: US 10,900,983 B2
(45) Date of Patent: Jan. 26, 2021

(54) METHOD FOR OPERATING A DOSING DEVICE

(71) Applicant: CTC Analytics AG, Zwingen (CH)

(72) Inventors: Lucas Luethy, Zurich (CH); Beat Luethy, Zurich (CH)

(73) Assignee: CTC ANALYTICS AG, Zwingen (CH)

( * ) Notice: Subject to any disclaimer, the term of this patent is extended or adjusted under 35 U.S.C. 154(b) by 440 days.

(21) Appl. No.: 15/472,777

(22) Filed: Mar. 29, 2017

(65) Prior Publication Data

US 2017/0285055 A1 Oct. 5, 2017

(30) Foreign Application Priority Data

Mar. 30, 2016 (EP) .................................... 16162952

(51) Int. Cl.
*G01N 1/12* (2006.01)
*G01N 35/10* (2006.01)
(Continued)

(52) U.S. Cl.
CPC ..... *G01N 35/1016* (2013.01); *G01F 23/2921* (2013.01); *G01N 35/1004* (2013.01);
(Continued)

(58) Field of Classification Search
CPC .......... G01N 1/2035; G01N 1/20; G01N 1/12; G01N 30/24; G01N 30/04; G01N 35/025; G01N 35/02; G01N 35/08; B01L 3/021; B01L 3/00; B01L 3/0275

USPC ...... 436/50, 54, 43, 49; 422/67, 81, 63, 500, 422/501; 73/863.02, 863, 864, 864.01, 73/864.21

See application file for complete search history.

(56) References Cited

U.S. PATENT DOCUMENTS 5,919,706 A 7/1999 Tajima
6,593,146 B1 * 7/2003 Lang .................... B01L 3/0206
422/501

(Continued)

FOREIGN PATENT DOCUMENTS

DE 10 2007 003 040 B4 9/2010
EP WO 01/65214 A2 9/2001
(Continued)

*Primary Examiner* — Christine T Mui
(74) *Attorney, Agent, or Firm* — Birch, Stewart, Kolasch & Birch, LLP

(57) ABSTRACT

A method for operating a dosing device comprising a control unit, a dosing unit with a cannula of a first volume, and a sampling container connected to the cannula. The method comprises moving the dosing unit in a first direction along an axis to move the cannula into a vessel containing a liquid; constantly aspirating fluid through the cannula with a predetermined volumetric flow; measuring at least one optical parameter of the aspirated fluid; when a change of the optical parameter is detected, storing a first position of the dosing unit on the axis and interrupting the movement of the dosing unit; and calculating a second position of the dosing unit on the axis at which the tip of the cannula has penetrated a first phase boundary upon immersion into the liquid. The calculation is performed on the basis of the first position, the predetermined speed, the first volume and the predetermined volumetric flow.

10 Claims, 3 Drawing Sheets

(51) Int. Cl.
  *G01F 23/292* (2006.01)
  *G01N 30/24* (2006.01)
  *B01L 3/00* (2006.01)

(52) U.S. Cl.
  CPC . *G01N 35/1011* (2013.01); *G01N 2035/1006* (2013.01); *G01N 2035/1025* (2013.01)

(56) References Cited

U.S. PATENT DOCUMENTS

| | | | |
|---|---|---|---|
| 7,488,451 B2* | 2/2009 | Zarowitz | B01L 3/021 422/504 |
| 2008/0192255 A1 | 8/2008 | Burk et al. | |
| 2011/0262919 A1* | 10/2011 | Tajima | C12Q 1/6804 435/6.11 |
| 2014/0150923 A1* | 6/2014 | Stalder | G01N 30/18 141/1 |

FOREIGN PATENT DOCUMENTS

| | | |
|---|---|---|
| EP | 2 011 872 A1 | 1/2009 |
| EP | 1 756 587 B1 | 10/2013 |
| EP | 2 875 912 A1 | 5/2015 |

* cited by examiner

METHOD FOR OPERATING A DOSING DEVICE

TECHNICAL FIELD

The invention relates to a method for operating a dosing device and also to a dosing device, by which method/with which dosing device it is possible to measure the liquid level of a liquid present in a vessel and/or the level of a phase boundary in this liquid.

PRIOR ART

In laboratory facilities, increasing use is being made of automated systems with which defined volumes of liquids, reagents or solvents can be dosed into reaction vessels or can be injected into analysis apparatuses. Dosing devices of this kind generally have dosing units which have a cannula and with which the volumes can be withdrawn and then dispensed again. The dosing devices can usually be driven by a motor in at least two spatial directions, in particular in a vertical direction (z direction) and at least one horizontal direction (x or y direction), thereby permitting automatic working of the dosing devices.

However, a difficulty lies in moving the cannula so far in the vertical direction that it dips into a liquid located in a sample vessel or reagent vessel, but not too deeply, since otherwise there is an increased likelihood of liquid remaining attached to the outer wall of the cannula, which liquid could then drip off the cannula and could thus distort the dosed volume or could contaminate a liquid located in another vessel.

To determine the filling level, a number of solutions are known in the prior art. For example, the immersion of the cannula into a liquid can be detected by a capacitive measurement on the cannula. However, this requires that the liquid is conductive, since otherwise no measurement can take place.

Systems are also known which are based on optical systems. For example, DE 10 2007 003 040 B4 (Stratec Biomedical Systems AG) discloses a device and a method for the optical detection of a phase transition between at least two media. The device comprises a needle and, integrated therein, a transparent line with a fiber-optic sensor formed by at least one optical waveguide whose measurement point is arranged as close as possible to the suction or discharge opening of the needle. Phase transitions can be detected from the signals detected by the fiber-optic sensor, which signals are influenced by the refractive indices of the fluids located in the line. The phase transitions can be used, for example, to calculate the aspirated volume or as a replacement for a capacitive measurement for filling-level determination.

EP 1 756 587 B1 (bioMerieux Inc.) describes a device for aspirating and dispensing a volume of liquid using an optical detection unit. The device comprises two optical waveguides for transmitting/receiving a light signal, wherein the light signal is coupled into an aspirator tip with optically transmissive material or is received from said tip. The aspirator tip is moved linearly by a drive, wherein the received light signal changes when the aspirator tip is in contact with a liquid surface, such that a control can determine the height of the liquid surface on the basis of the position of the drive when the aspirator tip is in contact with said liquid surface.

The methods and devices known from the prior art have the disadvantage that they require special cannulas or aspirator tips, which greatly increases the costs of operating such devices. Moreover, a part of each of the optical components is immersed in the liquid, which can pose problems as regards cleaning.

DISCLOSURE OF THE INVENTION

The object of the invention is to make available a method which pertains to the technical field mentioned at the outset and which permits the operation of a dosing device with filling-level determination, which device is of simple construction and does not require specially designed cannulas or aspirator tips.

According to the invention, the method for operating a dosing device with a control unit and a dosing unit, the latter having a cannula with a first volume and a tip and also a sampling container fluidically connected to the cannula, comprises a first step of moving the dosing unit linearly at a predetermined speed in a first direction along an axis, such that the cannula is moved into a vessel with at least one liquid. Thereafter, fluid is aspirated constantly through the cannula with a predetermined volumetric flow by a pump device. At least one optical sensor measures at least one optical parameter of the aspirated fluid, wherein the at least one sensor is arranged between the cannula and the sampling container. When a change of the at least one optical parameter is detected, a first position of the dosing unit on the axis is stored by the control unit and the movement of the dosing unit is interrupted. Then, on the basis of the first position, the predetermined speed, the first volume and the predetermined volumetric flow, the control unit calculates a second position of the dosing unit on the axis, at which second position the tip of the cannula has penetrated a phase boundary, in particular upon immersion of the tip into the liquid.

A dosing device according to the invention comprises a control unit and a dosing unit. The dosing unit has a cannula with a first volume and a tip and a sampling container connected fluidically to the cannula. Moreover, the dosing device comprises a drive with which the dosing unit can be moved linearly along an axis, and a pump device with which a fluid can be conveyed through the cannula into or out of the sampling container. Between the cannula and the sampling container there is an optical sensor directly adjoining the cannula. The optical sensor is designed to measure at least one optical parameter of a fluid aspirated through the cannula. The dosing device is suitable in particular for carrying out the method according to the invention.

By means of the method according to the invention and the dosing device according to the invention, the filling level of a liquid in a sampling container can be determined without having to use special cannulas. Quite the contrary, it is possible to use any desired cannulas, of which only the volume has to be known. On the basis of this volume, the predetermined speed and the predetermined volumetric flow, the control unit can then calculate at which position of the dosing unit, along the axis, the tip of the cannula is immersed in the liquid. Moreover, the method according to the invention also has the advantage that no part of the sensor required for determining the filling level is immersed in the liquid, as a result of which no cleaning of the sensor is needed.

The cannula preferably has a cylindrical cavity through which a fluid can be aspirated or expelled. More preferably, the cannula is preferably made of a metal, in particular steel. By using a metal cannula, it is possible to ensure that there are no changes of volume caused by deformations. The tip of the cannula is preferably blunt. Alternatively, the tip of the cannula can also have a beveled cut, for example so as to be able to more easily pierce a septum which, for example, closes a vessel. Depending on the intended purpose, cannulas with different external diameters, different lengths and/or varying volumes can be used. The control unit preferably has input means by which the volume of the cannula used can be adjusted. Alternatively, the dosing device can also have means by which the volume of the cannula used is automatically detected, for example by reading out data that are applied to the cannula or are stored therein. Alternatively, however, the dosing unit can also be designed such that it can be used only with cannulas that have a defined volume.

The sampling container is preferably designed as the barrel of a syringe. More preferably, however, the sampling container can also be designed as a sample loop which is arranged between the cannula and the syringe. By using a sample loop as sampling container, a greater volume of the sample liquid can be withdrawn. Moreover, this also makes it possible to ensure that the pump device does not come into contact with the sample liquid, which greatly simplifies the cleaning of the dosing unit, since only the sample loop and the cannula have to be cleaned. The sampling container can be fluidically connected to the cannula either directly or via a line, for example a tube. In this case, the optical sensor is arranged between the cannula and the line.

In the context of the present application, the expression "fluidically connected" is understood as meaning that two elements are connected to each other either directly or via an intermediate piece in such a way that a fluid can be conveyed between these elements substantially without loss.

In order to move the dosing unit, the dosing device preferably has an electric motor. A servo motor or a stepping motor is particularly preferably used as the motor. This allows the dosing unit to be driven with the greatest possible precision and, in addition, conclusions concerning the position of the dosing unit along the axis can be drawn on the basis of the motor.

Moreover, the dosing device preferably has means by which the rotation movement of the electric motor can be converted into a linear movement. These means, for example, can take the form of a spindle or a toothed belt.

The dosing unit is preferably movable along the axis via at least one linear guide. The at least one linear guide can be designed, for example, as a linkage, guide groove or spindle, with which the dosing unit is in engagement.

The axis is in particular oriented in such a way that it is oriented in the vertical direction (z direction) in the intended use of the dosing device, in which the latter sits on the base. In a vertical arrangement of the vessel, the orientation of the axis accordingly corresponds to the longitudinal axis of the vessel.

The liquids in question basically include all liquids that have to be dosed in a laboratory. Particularly preferably, however, the liquids are sample liquids that are intended to be injected into an analysis apparatus, for example a spectrometer, or reagents that are subsequently to be added to a sample liquid or a reaction mixture.

The control unit preferably has a microcontroller or a chip which is able to control the individual components of the dosing device and to perform calculations. The control unit moreover preferably has a memory.

The first speed can preferably be defined by a user via the control unit. For this purpose, the control unit has suitable input means, for example a keyboard or a touch screen. Alternatively, the first speed can also be predefined and fixed by the manufacturer.

The control unit and the electric motor preferably have means by which it is possible to monitor compliance with the predetermined first speed and, if necessary, to make adjustments. For example, the speed of rotation of a shaft of the electric motor can be monitored via an encoder or the like. The control unit in this case simply has to know the ratio between the speed of rotation of the electric motor and the linear speed of the dosing unit along the axis in order to adjust the speed of rotation of the electric motor to a suitable value.

The dosing device moreover has a pump device. Alternatively, the dosing device can be attached to an external pump device. The pump device is preferably controlled by the control unit, such that the control unit can monitor the compliance with the predetermined volumetric flow via the pump device. Preferably, the predetermined volumetric flow can be modified by a user via the control unit.

A person skilled in the art will be aware of various pump devices with which a constant volumetric flow can be achieved. The pump device used is preferably a piston which is mounted displaceably inside a cylinder which, for example, serves as sampling container. To displace the piston, a motor-driven actuator is also preferred.

In a preferred embodiment, the dosing unit is connected releasably to the dosing device. This affords the advantage that a suitable dosing unit can be used according to the intended purpose of the dosing device. Moreover, after a certain period of use or after a certain number of dosing operations, the dosing unit can easily be replaced by a new dosing unit in order to ensure a constant quality and constant precision of the dosing operations. Particularly preferably, the control unit has input means with which a user permits the replacement of the dosing unit and, if appropriate, the selection or the input of parameters of the dosing unit. Alternatively, the dosing device can also have means by which the replacement of the dosing unit is detected and parameters of the newly inserted dosing unit are automatically identified, for example by automatic reading-in or identification of markings or data located on the dosing unit.

The dosing device is particularly advantageously designed to receive syringes as dosing units. For this purpose, it is simply necessary to provide a holder for the barrel of the syringe and a linearly displaceable holder for the piston. A dosing device of this kind is disclosed, for example, in EP 2 261 676 B1 (CTC Analytics).

The at least one optical sensor is preferably arranged between the cannula and the sampling container in such a way that said container bears directly on the cannula, that is to say such that there is no dead volume present between the cavity of the cannula and the sensor. In this way, only the first volume of the cannula is present between the tip of the cannula and the sensor.

One optical sensor is preferably used. Alternatively, several optical sensors can also be used which alternately measure the same optical parameter or alternatively different optical parameters.

With the at least one optical sensor, the change of a light ray emitted by a light source and passing through the fluid can preferably be measured. The light source used can, for example, be a light-emitting diode or a laser source. An infrared light-emitting diode is preferably used as the light source, that is to say at least one optical parameter of infrared light is measured by the at least one optical sensor. The at least one optical sensor therefore comprises a light source and a light receiver, which are preferably electrically connected to the control unit.

The at least one optical sensor is preferably arranged in a sensor housing which, by way of coupling devices, can be connected releasably to the cannula and to the sample container or to a line leading to the sample container.

The coupling devices are preferably couplings of the Luer system. In this way, the housing and therefore the sensor can be secured easily and quickly to a syringe and to a standard cannula. Alternatively, however, the couplings can also have a threading or a ground edge, for example, by which it is possible to achieve leaktight connections.

By measuring the at least one optical parameter, it is possible in particular to detect phase boundaries of the fluid that is aspirated through the cannula in the direction of the receiving container. To determine a filling level of the vessel, a phase transition from gas, in particular air, to liquid is in particular detected. However, it is also thereby possible to detect phase boundaries of two liquids, for example a phase boundary between a hydrophilic liquid and a hydrophobic liquid. The measured optical parameter is therefore preferably a parameter that is able to reliably indicate a phase boundary.

If a phase boundary in the fluid passes through the at least one optical sensor, the at least one measured optical parameter will change. In this case, the movement of the dosing unit along the axis is interrupted, and the position of the dosing unit on the axis is stored as first position by the control unit.

The at least one sensor is located between the cannula and the sampling container, that is to say the sensor is arranged on the end of the cannula opposite the tip of the cannula. The penetration of a phase boundary by the tip of the cannula is accordingly detected by the sensor with a time delay. This time t corresponds to the volume of the fluid $V_F$ located between the tip of the cannula and the sensor, divided by the predetermined volumetric flow S:

$$t = \frac{V_F}{S}$$

Since the dosing unit is moved along the axis at a constant predetermined speed v, the distance x traveled within the time t can be calculated:

$x=t*v$

From the stored first position and from the distance x traveled, the control unit can therefore calculate at which position the dosing unit was located at the time when the tip of the cannula penetrated the phase boundary. This position is stored as second position by the control unit.

The cannula and the sampling container are preferably filled with a rinsing liquid when not in use. Before the linear movement, a predefined volume of air is preferably aspirated into the cannula, such that, even with a high filling level of the liquid, no mixing can take place between the liquid and the rinsing liquid. After completion of the method, the cannula and the sampling container are cleaned with the rinsing liquid and then filled with the latter.

A user preferably selects the nature of the vessel from a list on the control unit or enters parameters of the vessel, in particular volume, shape and/or diameter. The control unit thus obtains information concerning the vessel used, which information is relevant for controlling the dosing device.

Preferably, the at least one sensor measures the refractive index, the turbidity and/or the transmission of light rays of at least one predetermined wavelength in the fluid, in particular light rays in the infrared range.

Before the dosing unit is moved, the vessel is preferably placed in a holder of the dosing device which is arranged in such a way that an upper edge of the vessel comes to lie at a defined basic position relative to the axis. The volume of liquid located in the vessel is calculated by the control unit on the basis of the second position and of the nature or parameters of the vessel.

In particular, the dosing device has a rack with a large number of holders which allow vessels of a certain type to be arranged in such a way that the upper edges of the vessels all lie in the same plane.

By selecting the type of vessel or entering the parameters, it is possible for the control unit to calculate the absolute filling level of the liquid in the vessel starting from the second position. In particular, the control unit uses calibration curves in which a correlation between second position and filling level is stored. Alternatively, a calibration curve can also be calculated by the control unit on the basis of the shape of the vessel and its height and diameter. Since a large number of parameters have to be input for this purpose, for example shape of the vessel, shape of the vessel tip, height of the vessel, height of the vessel tip, etc., provision is preferably made that a user is able to select from a list of vessels that can be used with the dosing device, of which the calibration curves are already stored in the memory of the control unit.

Possible vessels are, for example, microreaction vessels, specimen glasses and/or centrifuge tubes, with various capacities, for example 15 ml, or 50 ml for centrifuge tubes.

Preferably, the dosing unit is then moved further at the predetermined speed along the axis in the first direction until the sensor again detects a change of the at least one optical parameter. The movement is interrupted and a third position of the dosing unit on the axis is stored. On the basis of the third position, the predetermined speed, the first volume and the predetermined volumetric flow, the control unit calculates a fourth position along the axis, at which fourth position the tip of the cannula has penetrated a second phase boundary within the liquid.

In this way, the method according to the invention can be used, for example, to determine the filling level in a vessel containing two liquid phases, wherein the liquid level of the second phase can also be determined at the same time.

As a person skilled in the art will appreciate, the dosing unit, in the case of a three-phase liquid, can then be moved further on in order to measure the liquid level of the third phase.

Preferably, the dosing unit is moved back in a second direction, which is counter to the first direction, until it lies along the axis at a position which, along the axis, lies a predefined distance further in the first direction than the second position or the fourth position, wherein the pump device then aspirates fluid at a predetermined volumetric flow through the cannula and the dosing unit is moved in the first direction at a second speed which is calculated by the control unit on the basis of the predetermined volumetric flow and the type of vessel or of the input parameters in such a way that the tip of the cannula remains constantly by the predefined distance in the first direction below the first phase boundary or the second phase boundary.

It is thus possible to remove liquid from the first phase or the second phase, wherein the tip of the cannula only remains just below the phase boundary, in particular below the boundary between air and liquid. In this way, for example, it is possible to avoid a situation where, after centrifugation, sediment located at the bottom of the vessel is stirred up and aspirated, since the cannula is moved only so far into the vessel that the tip is only just immersed in the liquid.

Preferably, the method according to the invention comprises moving the dosing unit along the axis in a second direction, which is counter to the first direction, in order to remove the cannula from the vessel. The liquid present in the cannula and in the vessel is then ejected into a pouring vessel, wherein the vessel and the cannula are preferably also rinsed with a rinsing liquid. Thereafter, the dosing unit is moved in the first direction until it lies at a position which, along the axis, lies a predefined distance further in the first direction than the second position. The pump device then aspirates fluid with a predetermined volumetric flow through the cannula, wherein the dosing unit is moved in the first direction at a second speed which is calculated by the control unit, on the basis of the predetermined volumetric flow and the nature of the vessel or of the input parameters, in such a way that the tip of the cannula lies constantly below the first phase boundary by the predefined distance in the first direction. The method is interrupted when the dosing unit reaches a position along the axis which lies away from the fourth position by a second predetermined distance in the second direction.

This means that the liquid in the first phase can be removed as completely as possible, without the risk of also removing liquid of the second phase, which would lead to contamination.

Further advantageous embodiments and combinations of features of the invention will become clear from the following detailed description and from the entirety of the claims.

BRIEF DESCRIPTION OF THE DRAWINGS

In the drawings used to explain the illustrative embodiment.

In principle, identical parts in the figures are provided with identical reference signs.

WAYS OF IMPLEMENTING THE INVENTION

Figure 1:
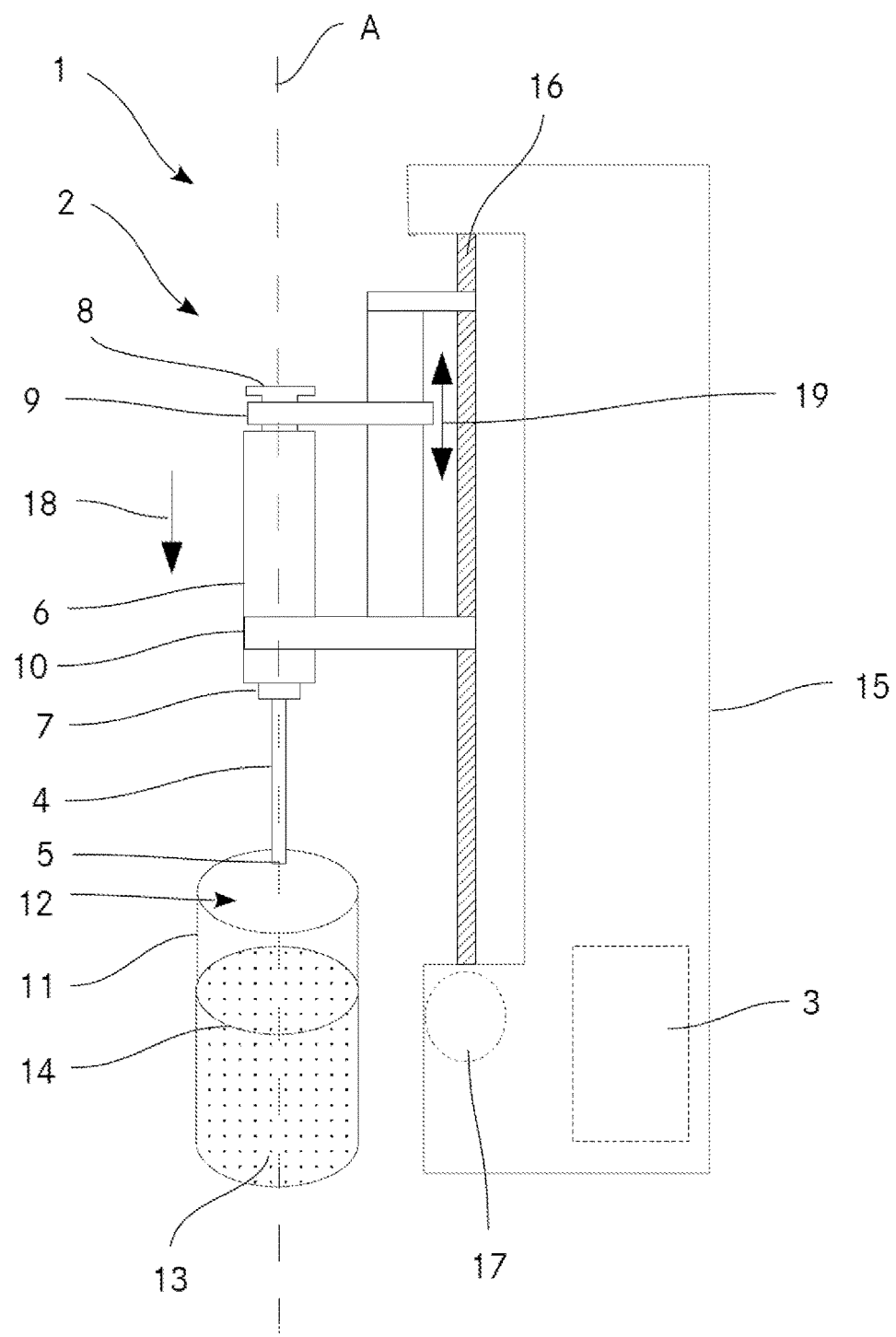
FIG. 1 shows a schematic view of an embodiment of a dosing device according to the invention in a first method step.
Figure 2:
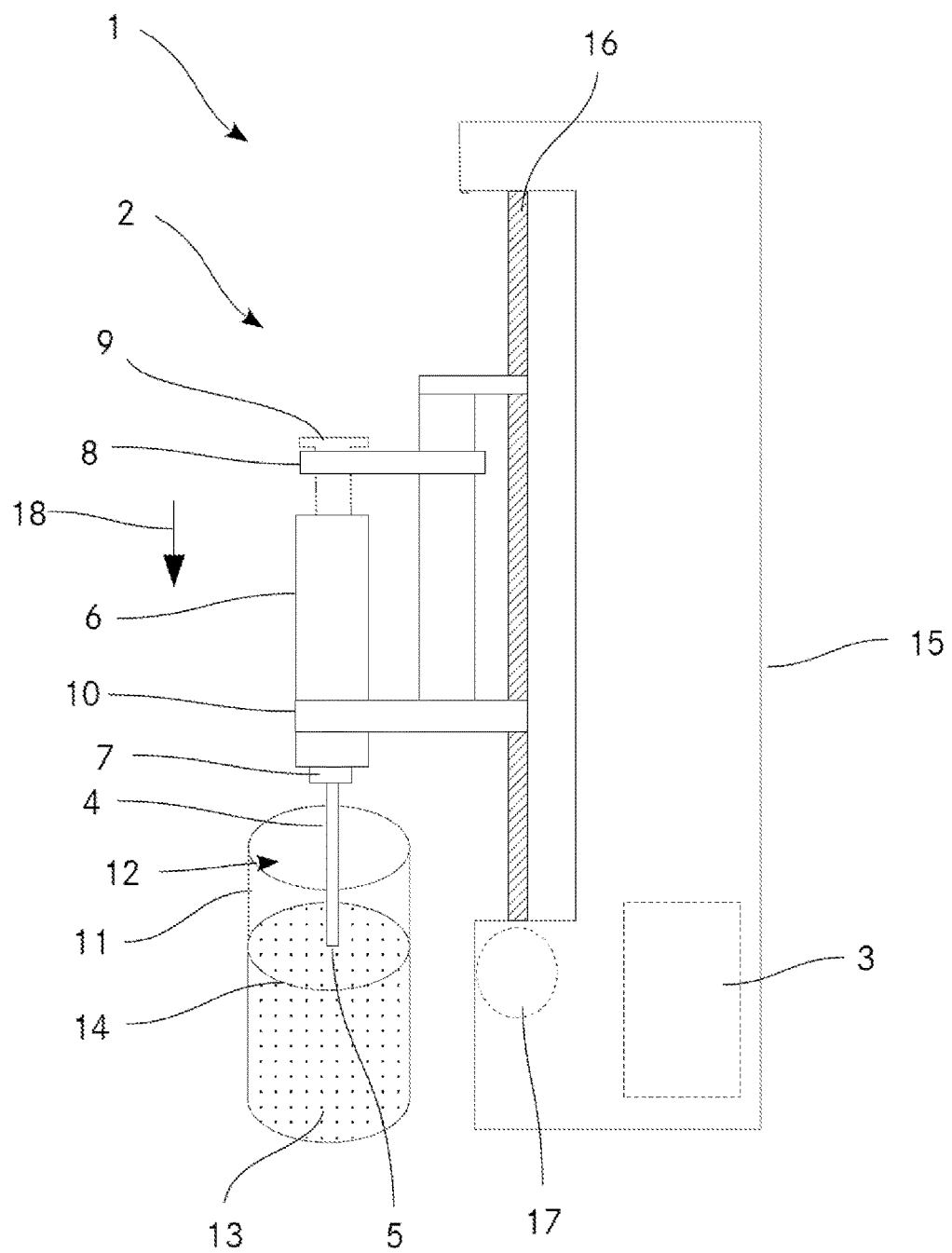
FIG. 2 shows the dosing device from FIG. 1 in a further method step.
Figure 3:
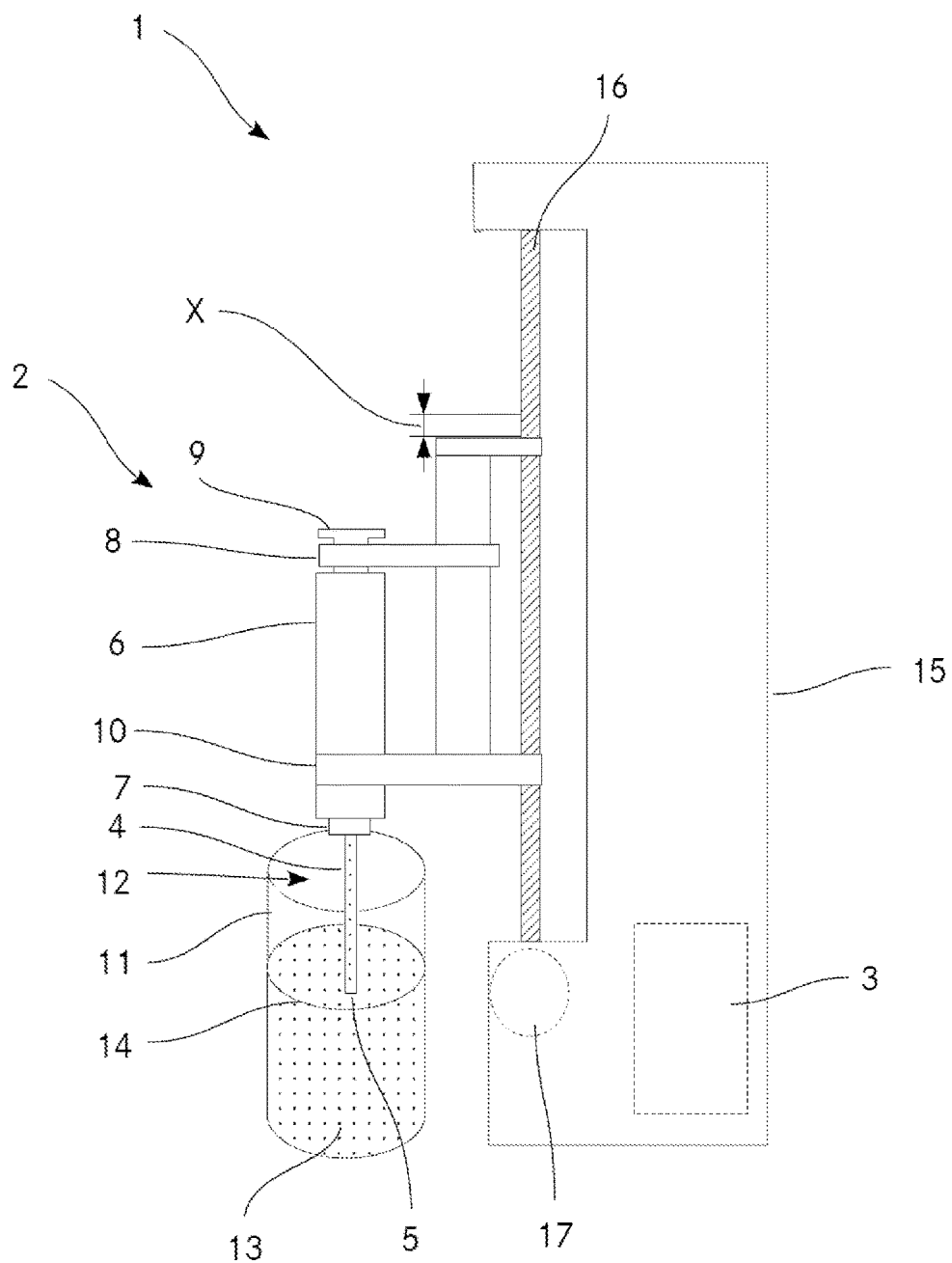
FIG. 3 shows the dosing device from FIG. 1 at the point in the method when the optical sensor detects a phase boundary.

FIG. 1 shows an embodiment of a dosing device 1 according to the invention. Different steps of the method according to the invention are shown in FIGS. 1 to 3 on the basis of the dosing device 1.

The dosing device 1 has a dosing unit 2. In the embodiment shown, the dosing unit 2 is designed as a syringe comprising a cannula 4. The cannula 4 has a tip 5 which can be inserted into a vessel 11 in order to remove or dispense liquid. Moreover, the dosing unit 2 has a sampling container 6 which, in the embodiment shown, is designed as a barrel of the syringe. As pump device 9, the dosing device 1 in the embodiment shown has an actuator 8 which is linearly movable by a motor and with which a piston 9 inside the syringe barrel functioning as sampling container 6 can be moved in two directions 19. In the embodiment shown, the syringe is secured in a holder 10 of the dosing device 1.

The dosing device 1 moreover comprises a control unit 3, which is merely symbolized in the figures. The control unit 3 is arranged in a housing 15 of the dosing device 1. Moreover, the dosing device has a drive with which the dosing unit 2 can be moved along an axis A. In the embodiment shown, the drive is a spindle 16 which can be moved in rotation by an electric motor 17. A thread arranged on the spindle engages in a corresponding thread of the holder 10, as a result of which the holder 10, and with it the dosing unit 2, can be moved along the axis A in a first direction 18 or in a direction counter to the latter during rotation of the spindle 16, depending on the direction of rotation of the latter.

Arranged between the cannula 4 and the sampling container 6 is an optical sensor 7 with which it is possible to measure at least one optical parameter of a fluid flowing through the cannula 4 into the sampling container 6 or vice versa. The optical sensor 7 is connected to the control unit and transmits data to the latter.

FIG. 1 at the same time shows a first step of the method according to the invention. In this step, the dosing unit 2 is moved by the drive at a first predetermined speed in the first direction 18 along the axis A, in order to move the tip 5 of the cannula 4 into the vessel 11. The vessel 11 has an opening 12 into which the cannula 4 can be inserted. The opening 12 can also be closed by a septum through which the cannula can be pushed. In the vessel there is a liquid 13 which has a filling level that forms a phase boundary 14 between the liquid 13 and the ambient air.

At the same time as the dosing unit 2 starts moving, fluid is aspirated by the pump device 9 through the cannula 4 into the sampling container 6 at a constant, predetermined volumetric flow. In the first step according to FIG. 1, ambient air is initially aspirated. The optical parameter measured by the optical sensor 7 will therefore have a substantially constant value.

FIG. 2 shows the dosing device 1 at the point in the method when the tip 5 of the cannula 4 dips into the liquid 13 and when the phase boundary 14 is penetrated by the tip 5. Starting from this point, it is therefore no longer ambient air that is aspirated into the cannula, but the liquid 13. At this point, the dosing unit is located at a second position. However, since the optical sensor 7 is located between the cannula 4 and the sampling container 6, the optical sensor 7 does not detect any phase transition. It is only after the entire volume of ambient air inside the cannula 4 has been aspirated into the sampling container 6 that the liquid 13 aspirated into the cannula 5 will pass the optical sensor 7. At this point, the optical sensor accordingly registers the phase transition.

This situation is shown in FIG. 3. Since, during the period when the liquid 13 still present inside the cannula 4 is aspirated into the sampling container 6, the dosing unit 2 is moved as before in the first direction 18 at the first speed, the tip 5 of the cannula 4 will penetrate deeper into the liquid 13 until the phase transition is detected by the optical sensor 7. The dosing unit 2 is at this point located in the first position. Compared to the second position in which the tip 5 of the cannula 4 has penetrated the phase boundary 13, the first position is a distance X further in the first direction. To be able to determine the second position, the control unit 3 calculates, on the basis of the predefined volumetric flow and the defined volume of the cannula 4, the time t during which the cannula 4 has been filled completely with the liquid 13 or during which the ambient air remaining in the cannula has been aspirated completely into the sampling container 6. On the basis of the predetermined first speed, the control unit 3 can then calculate the distance X traveled by the dosing unit within the time t. With this distance X, the control unit can finally calculate the second position of the dosing unit 2 at the point when the tip 5 of the cannula 4 has penetrated the phase boundary 13.

The invention claimed is:

1. A method for operating a dosing device, said dosing device comprising a control unit and a dosing unit, said dosing unit having a cannula with a first volume and a tip, said dosing unit also comprising a sampling container fluidically connected to the cannula, said method comprising the following steps:
   a) moving the dosing unit linearly at a predetermined speed in a first direction along an axis, such that the cannula is moved into a vessel containing at least one liquid;
   b) aspirating a fluid constantly through the cannula, with a predetermined volumetric flow, by a pump device;
   c) measuring at least one optical parameter of the aspirated fluid using at least one optical sensor, which is arranged between the cannula and the sampling container;
   d) when a change of the at least one optical parameter is detected, using the control unit to store a first position of the dosing unit on the axis and interrupting the movement of the dosing unit;
   e) using the control unit to calculate a second position of the dosing unit on the axis, at which second position the tip of the cannula has penetrated a first phase boundary, in particular upon immersion into the liquid, on the basis of the first position, the predetermined speed, the first volume and the predetermined volumetric flow.

2. The method according to claim 1, comprising the step of selecting the nature of the vessel from a list or entering parameters of the vessel, including volume, shape or diameter, using the control unit.

3. The method according to claim 1, wherein the at least one optical sensor measures the refractive index, the turbidity or the transmission of light rays of at least one predetermined wavelength in the fluid.

4. The method according to claim 2, wherein before the dosing unit is moved, the vessel is placed in a holder of the dosing device which is arranged in such a way that an upper edge of the vessel comes to lie at a defined basic position relative to the axis, and the volume of liquid located in the vessel is calculated by the control unit on the basis of the second position and of the nature or parameters of the vessel.

5. The method according to claim 1, wherein the dosing unit is moved further along the axis in the first direction at the predetermined speed until the optical sensor again detects a change of the at least one optical parameter, wherein the movement is interrupted and a third position of the dosing unit on the axis is stored, and wherein a fourth position along the axis is calculated on the basis of the third position, the predetermined speed, the first volume and the predetermined volumetric flow, at which fourth position the tip of the cannula has penetrated a second phase boundary within the liquid.

6. The method according to claim 5, wherein the dosing unit is moved back in a second direction, which is counter to the first direction, until the dosing unit lies along the axis at a position which, along the axis, lies a predefined distance further in the first direction than the second position or than the fourth position, wherein the pump device then aspirates fluid with a predetermined volumetric flow through the cannula, and the dosing unit is moved in the first direction at a second speed which is calculated by the control unit on the basis of the predetermined volumetric flow and the nature of the vessel or of the input parameters of the vessel in such a way that the tip of the cannula remains constantly, by the predefined distance in the first direction, below the first phase boundary or the second phase boundary.

7. The method according to claim 5, wherein the method further comprises:
   a) moving the dosing unit along the axis in a second direction, which is counter to the first direction, in order to remove the cannula from the vessel;
   b) ejecting the liquid present in the cannula and in the sampling container into a pouring vessel;
   c) moving the dosing unit in the first direction until the dosing unit lies at a position which, along the axis, lies a predefined distance further in the first direction than the second position, wherein the pump device then aspirates fluid with the predetermined volumetric flow through the cannula, and the dosing unit is moved in the first direction at a second speed which is calculated by the control unit, on the basis of the predetermined volumetric flow and the nature of the vessel or of the input parameters of the vessel, in such a way that the tip of the cannula remains constantly immersed in the liquid by the predefined distance in the first direction;
   d) interrupting the method when the dosing unit reaches a position along the axis which lies away from the fourth position by a second predetermined distance in the second direction.

8. A dosing device for carrying out a method according to claim 1, comprising a control unit and a dosing unit, the latter having a cannula with a first volume and a tip and also a sampling container connected fluidically to the cannula, and a drive with which the dosing unit can be moved linearly along an axis, and a pump device with which a fluid can be conveyed through the cannula into or out of a vessel, wherein, between the cannula and the sampling container, at least one optical sensor is mounted directly adjoining the cannula, which optical sensor is configured to measure at least one optical parameter of a fluid aspirated through the cannula.

9. The dosing device according to claim 8, wherein the at least one optical sensor is arranged in a sensor housing which is configured to be connected releasably to the cannula and to the sampling container or to a line leading to the sampling container.

10. The method according to claim 1, wherein the second position is calculated on the basis of a distance x travelled by the dosing unit within a time t, the time t being the time delay between the penetration of the phase boundary by the tip of the cannula and the detection of the change of the at least one physical parameter by the at least one optical sensor.

* * * * *